United States Patent Office 3,201,555
Patented Aug. 17, 1965

3,201,555
ELECTRIC CONTACT DEVICE HAVING MEANS
FOR LIMITING CONTACT PRESSURE
Guy H. Lacan, Saint-Germain-en-Laye, Seine-et-Oise, and
André G. Faffart, Nanterre, Seine, France, assignors to
La Telemecanique Electrique, Seine, France, a company of France
Filed Apr. 11, 1963, Ser. No. 272,361
Claims priority, application France, Apr. 14, 1962,
894,512; Mar. 11, 1963, 927,527
20 Claims. (Cl. 200—166)

This invention relates to electric contact devices of the general class including a frame carrying fixed contact means thereon, a member movable relatively to the frame between a contact-breaking and a contact-making position, a contact arm pivoted to said member and carrying movable contact means engageable with the fixed contact means in the contact-making position of the member, stop means being provided on the member for limiting the pivotal rotation of the contact arm towards the fixed contact means, and a spring carried by said member and having one end engaging the contact arm so as to be deformed in the contact-making position of the member and thereby ensure a prescribed contact pressure between the fixed and movable contact means when engaged.

Movement of the movable member in one direction is usually produced by power means, frequently employing electromagnetic attraction, while movement of the member in the opposite direction is generally produced by the biassing force of a restoring spring. Accordingly, contact devices of the class stated can be divided into two categories: the category of normally-open contacts, sometimes also known as "work contacts," wherein the movable member is moved from its contact-breaking to its contact-making position by power and from contact-making to contact-breaking position by the biassing force; and the category of normally-closed or "rest" contacts wherein the reverse is true.

It is especially evident in the case of the normally-closed or rest contacts, that the force of the spring provided on the contact device for determining the prescribed contact pressure in the engaged condition of the fixed and movable contacts, in conventional contact devices of the type specified above, opposes the force of the biassing spring serving to move the movable member from contact-breaking to contact-making position. This has necessitated either objectionably limiting the extent of the contact pressure used, laying the device open to the danger or defective electrical operation, or conversely increasing the power capacity of the means serving to move the movable member to contact-making position in opposition to the biassing spring. It is a specific object of the present invention to eliminate this difficulty and thereby to provide a contact device which will in all cases operate efficiently from the electrical standpoint while requiring reduced actuating power.

It is to be expressly understood that while the difficulty just mentioned as encountered in conventional contact devices is particularly manifest in the case of normally closed or rest contacts, it is by no means restricted thereto but may well arise in all cases where the power available for moving the member from contact-breaking to contact-making position is limited, whether said power be that of a biassing spring as in the rest-contacts mentioned above, or that of an actuating power device, of electromagnetic manual or other character, as in the case of normally open or work contacts. Clearly the above-stated object of the present invention is applicable also to such cases.

In accordance with the invention, in a contact device of the class specified above, there is provided on the movable member an additional, so-called follow-up arm pivoted to the member about a transverse axis (which may be parallel or coincident with the pivotal axis of the contact arm), and stop means are provided on the frame for limiting the pivotal rotation of the follow-up arm away from the fixed contact means. Owing to this arrangement, on movement of the movable member from contact breaking to contact making position there will occur a follow-up rotation of the follow-up arm about its axis away from the fixed contact means, thereby reducing the total amount of deformation sustained by said spring between the two positions, without modifying the final contact pressure achievable.

It thus becomes possible to ensure that the prescribed contact pressure is present in the final, contact-making position of the movable member, while reducing to a strict minimum the counter-effect of the contact spring pressure upon the power required to move the member to its contact making position. Said counter-effect may, in fact, be completely eliminated.

The invention is especially applicable to multiple contactor devices of the general class specified, wherein the frame comprises an array of fixed contact means spaced longitudinally thereof and the movable member, movable longitudinally with respect to the frame, has a corresponding array of movable contact assemblies associated with the respective fixed contact means and each including a pivoted contact arm carrying movable contact means and a spring carried on the frame and having an end engaging said contact arm for determining a prescribed contact pressure on engagement of the movable contact means with the associated fixed contact means. Usually, the fixed contact means are provided in pairs spaced transversely of the frame each pair adapted to be bridged, in the contact making position of the member, by the associated movable contact means.

Such multiple contactor devices are often used in connection with the programmed automatic control of electrical installations, and it is then required that certain of the contact assemblies of the multiple contactor shall act as normally-open or work contacts, and others as normally closed or rest contacts, depending on the particular programme. To facilitate the initial setting up and the subsequent modification of a programme in accordance with changing requirements, it is known in such multiple contactor devices to provide the individual contact assemblies reversible with respect to their mounting means in the fixed frame and/or in the movable member. In one mounted condition the assembly is arranged to behave as a work contact assembly while in the reversely mounted condition it is made to behave as a rest contact assembly.

It is an object of this invention to provide an improved multiple contactor device of this kind in which each contact assembly, when mounted so as to constitute a rest contact assembly, will operate in the improved manner involving follow-up as described above, while when reversely mounted to act as work contacts, the follow-up feature is eliminated and a more conventional type of operation is provided. For this purpose, the invention provides means on said member for blocking the follow-up arm against rotation when the movable contact assembly is mounted in said reverse condition to act as work contacts.

Other objects include the provision of multiple contactor devices provided with reversible movable contact assemblies of improved construction facilitating the manipulation thereof, as well as possessing improved operating characteristics; these improved characteristics may include, in addition to the presence of high contact pressure coupled with limited power requirements as provided by the follow-up action described above, an improved balancing feature whereby more uniform contact pressure can be achieved between the two fixed contacts of each pair as well as between the individual pairs of the multiple contactor device. A further feature is the feasibility, contemplated according to the invention, of mechanically interconnecting two or more multiple contactor devices of the improved type specified in order to expand the contact-making capacity of the initial device, as may be required, e.g., due to an expanded electrical installation, without requiring an alternation in the actuating power means. This, it may be noted, is a direct consequence of the limitation in power requirements afforded by the basic follow-up feature of the invention. Further objects are to provide such multiple contactor devices that will be simple, economical, study and effective over long periods of time with minimum maintenance.

Examplary embodiments of the invention will now be described for purposes of illustrating the above and further objects and features of the invention but without any intention of limiting the scope of the latter, with reference to the accompanying drawings, wherein.

Figures 1, 4, 6, 8:
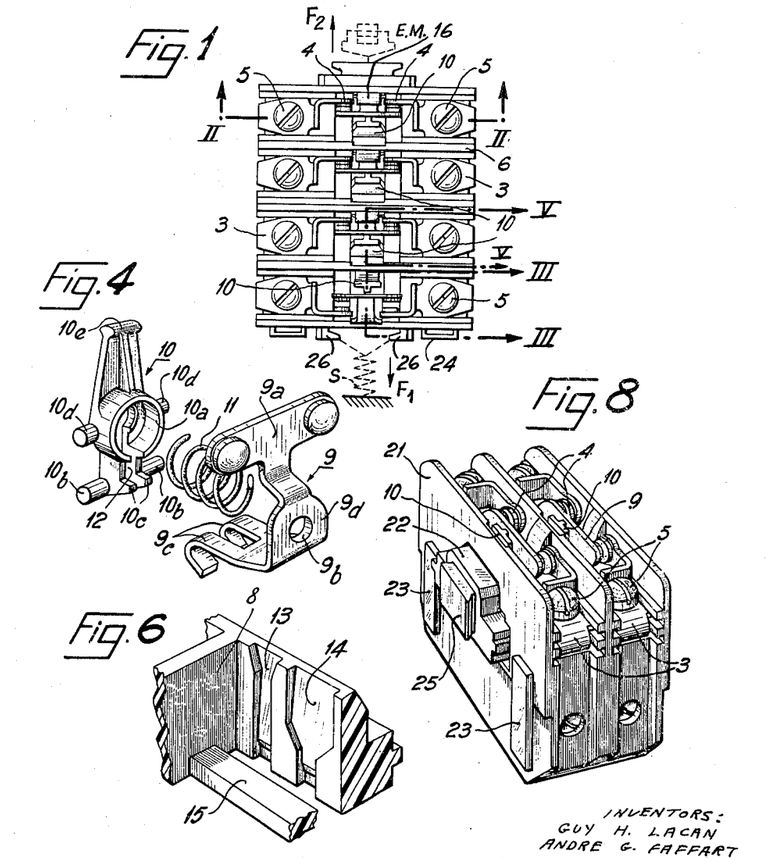
FIGURE 1 is a front view of a first embodiment of a multiple contactor device according to the invention, including four pairs of fixed contacts and four associated, reversible, movable contact assemblies.
FIGURE 4 is an exploded perspective view of a movable contact assembly of the embodiment of FIGURES 1–3.
FIGURE 6 is a perspective view, broken away, showing part of a socket in the movable member for receiving a movable contact assembly.
FIGURE 8 is a perspective view showing a contactor attachment adapted to be secured to and as an extension of the contactor device shown in FIGURES 1–7.
Figure 2:
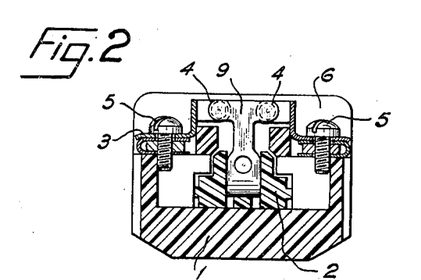
FIGURE 2 is a section on line II—II of FIGURE 1.

The contactor device shown generally in FIGURES 1 and 2 comprises a channel-shaped frame member 1 of insulating material supporting the fixed contact means thereon and a slider member 2 of insulating material mounted for longitudinal sliding displacement relatively to the frame 1 along the midline of the inner surface of the channel, which slider member 2 carries the movable contacts thereon. Said slider member may be actuated in the direction of arrow $F_2$ by an electromagnet EM and in the reverse direction (arrow $F_1$) by a spring S.

The fixed contacts are provided in pairs, and there are four pairs in the selected example, as visible in FIGURE 1. Each fixed contact comprises a conductor strip 3 cut out and bent to a suitable form as shown, including an L-shaped portion one leg of which is perforated for attachment to the frame, and an upstanding leg which in turn has an extension flange projecting at right angles from it and carrying on one side a contact lug 4. Each contact strip 3 is removably secured in position by means of a terminal screw 5 extending through the perforation in its outer leg and into a registering tapped hole provided in an upper side section of the frame member 1. The frame member 1 has a number of parallel spaced tranverse partitions 6 extending along its length, and the space between any two adjacent partitions provides a compartment in which one pair of stationary contacts are symmetrically positioned. Each pair of stationary contacts can be selectively mounted in one of two positions: in one position the flanges carrying the contact lugs 4 are in an upper position, as shown for the upper three pairs of contacts in FIGURE 1, and in the other position, said flanges are located in a lower position, as is the case with the lowermost contact pair in FIGURE 1. To change from one position to the other, it is simply necessary to remove the screws 5 securing the two contact members of the pair, exchange the two members, and remount them in their new inverted positions.

Figures 3A, 3B:
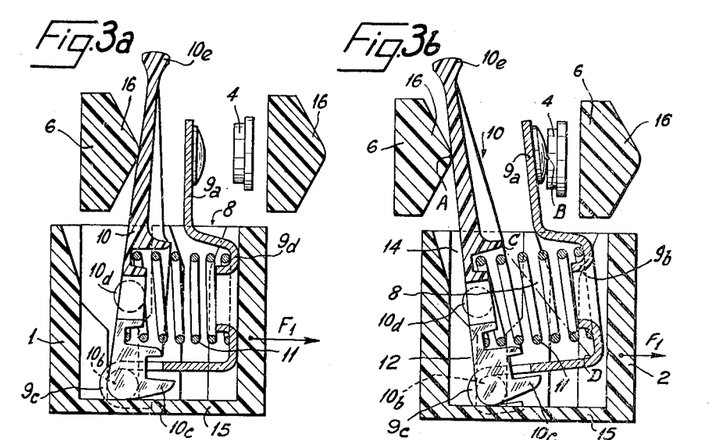
FIGURES 3a and 3b are sections on line III—III of FIGURE 1, on an enlarged scale, showing a movable contact assembly mounted as a rest contact assembly, and respectively shown in the actuated, contact-breaking, and in the normal, contact-making position of the movable member.

The slider 2 is formed along its length with a number of adjacent slots or sockets 8, one associated with each compartment 6 and each pair of stationary contacts (see FIGURES 3a and b). Each socket 8 contains a movable contact assembly shown in exploded perspective view in FIGURE 4. Each assembly as shown comprises three component units: a metallic contact arm 9, a follow-up arm or lever 10 of insulating material positioned opposite to the contact arm, and an interposed compression coil spring 11. The contact arm 9 is formed from a strip metal stamping and has a flat central portion 9d in the centre of which a hole 9b is punched so as to provide a flange or boss on one side (the side directed towards follow-up arm 10), said boss serving to seat and centre the related end of spring 11. Above and below the central part 9d there are two legs bent to extend towards the follow-up arm or lever 10, the lower leg being cut out and bent to provide a pair of spaced aligned hooks 9c, adapted to engage around aligned pins 10b of lever 10 as presently described. The upper leg of arm 9 is bent upwards and terminates in the form of a T or cross-member 9a which carries contact lugs at its end for bridging engagement with the stationary contacts 4 of each pair as will later appear.

The follow-up arm or lever 10 includes a central body part in the form of a cylindrical cup 10a adapted to receive and seat the related end of spring 11. Projecting upwards (in FIGURE 4) from the cup-shaped part is a leg terminating in a prehensile enlarged portion 10e. A pair of aligned pivot pins 10d project diametrically from the sides of the cup part 10a at right angles to said leg. The lower part of cup member 10a, i.e., the part remote from leg 10e, is slotted, as at 12, and on each side of the slot there is a downward extension terminating in a heel 10c projecting towards the contact arm 9. The afore-mentioned pivot pins 10b serving to engage with the hooks 9c of said contact arm project from the outer sides of said extensions.

In the assembled condition of the parts just described within a socket 8, the hooks 9c are engaged around the lower pivots 10b of lever 10, and compression spring 11 is seated between arm 9 and lever 10 in the manner described above to urge both said elements apart in rotation about the axis of pivots 10b. In the normal condition of this assembly, as will later become apparent, the spring 11 is moderately compressed and the plane of the contact-bearing cross member 9a of contact arm 9 is then substantially parallel with the general plane of follow-up lever 10, i.e., the plane normal to the axis of the cup-shaped part 10a. The pivotal connection between the arm 9 and lever 10 is such as to permit partial separation between a pivot pin 10b and the related hook 9c for a reason that will later appear. However, unwanted separation between these parts in the assembled condition is prevented since the hook portions 9c behave as a clevis surrounding the lower extensions of lever 10 from which the pivots 10b project, while the heels 10c of said extensions engage under the central surface of arm 9 between the two hooks 9c in the assembled condition of the parts. Owing to the slot 12, the lower part of the lever 10 has some elasticity along the direction of the axis of pivots 10b, for a purpose later indicated.

Each of the sockets 8 in the slider 2, which are rectangular in cross section and substantially box-shaped, has its opposite side walls, i.e., the walls at the sides of the slider 2, formed with pairs of opposite grooves. Thus, referring to FIGURE 6 where one of these side walls is shown, it will be seen that the inner surface of the wall is formed with two parallel grooves 13 and 14, and similar grooves are provided in symmetrical positions in the opposite side wall of the socket. The groove 13 over most of its height has a width corresponding to the diameter of the pins 10b, or 10d, of the lever 10, except for an enlarged, tapered entrance at the outer end of the groove. The groove 14 has a short inner section corresponding in width to the diameter of said lever pins, but is enlarged beyond said section over the major length of the groove. As will be explained later, the lever 10 can be selectively positioned either with its pairs of pins 10b and 10d both seated in the grooves 13 of the socket, or with said pairs of pins both seated in grooves 14. In the open bottom of each socket 8 there is a centrally longitudinally extending bar 15 which serves as a limit stop for the lower end of lever 10 when mounted in either of the pairs of grooves 13 or 14. Thus, referring for example to FIGURE 3a which is a section through the center of the central bar 15 and which shows a lever 10 mounted in the pair of grooves 14, it will be seen that the lower end of lever 10 is engaging the upper surface of the bar 15, while the hooks 9c engaged around the pins 10b of the lever are positioned on opposite sides of said bar, thereby contributing to the retention of said hooks in engagement with the pins 10b.

It will be understood that the afore-mentioned partitions 6 of the stationary frame member 1 are provided with aligned openings corresponding in contour to the cross section of slider 2 to permit the latter to extend the length of the frame member 1 and slide with respect to it. Moreover, each of the partitions 6 is formed, on at least one of its side surfaces, with an angular nose 16 (see FIGURE 3a, for example) in its centre, for acting as a stop for the follow-up lever 10 as later described.

In the embodiment of the invention illustrated in FIGURE 1, it will be assumed that the slider 2 is actuated in the upward direction of that figure by motive power, such as the attraction of an electromagnet, and is returned in the downward direction by a restoring spring force. In that case, the upper three sets of contacts shown in FIGURE 1 clearly act as "work contacts," i.e., are normally open and closed in the actuated condition, while the lowermost set of contacts are rest contacts, i.e., normally closed. With the assumption just made, the arrangement is such that in each of the sockets 8 of the slider 2, the pair of broader slots 14 are positioned in the upper position (as seen in FIGURE 1), while the pair of narrower slots 13 is located in the lower position. In each case where it is desired to provide normally-open or work contacts, e.g. for the upper three pairs of contacts as shown in FIGURE 1, the follow-up lever 10, after assembly with the associated contact arm 9 in the manner described above, is positioned with both of its pairs of pins 10b and 10d received in the broader grooves 14 of the related socket 8, i.e., in the lower part of the socket as earlier indicated.

Figures 5A, 5B, 7:
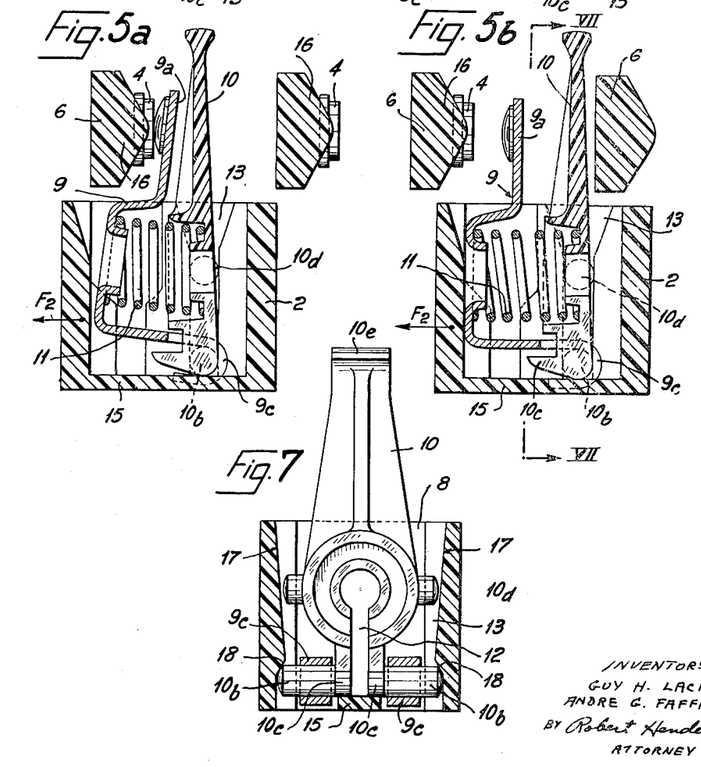
FIGURES 5a and 5b are sections on the line V—V of FIGURE 1, i.e. views similar to FIGURES 3a and 3b respectively, but with the movable contact assembly being shown mounted as a work contact assembly, respectively in the actuated, contact-making position and the normal, contact-breaking position of the movable member.
FIGURE 7 is a section on line VII—VII of FIGURE 5b.

The contour of the grooves 14 on a plane transverse to the length dimension of the slider 2, is the same as the contour of the grooves 13, as shown in FIGURE 7. It will be seen that each groove has a major part of its contour converging at a low rate inwardly providing a ramp 17, which is followed by a sharp increase in depth of the groove as at 18. When the lever pins 10b are engaged in a pair of the grooves 13 or 14, and the lever is then pushed down into the socket 8, the converging ramp surfaces 17 press the pins 10b towards each other, gradually closing the gap 12 as permitted by the resiliency of the lever material, then the pins snap outwards as they enter the depressions 18, whereupon the follow-up arm or lever is locked in position within the socket. The depressions 18 in the grooves are so positioned that when the lower end of the follow-up arm or lever 10 engages the upper surface of bar 15 at the bottom of the socket, the rounded ends of the pins 10b still engage the bevel surfaces at the upper parts of the depressions 18 as shown in FIGURE 7, so that the lever is retained snugly and without backlash within the pair of opposed grooves 13 or 14.

When the follow-up arm or lever has thus been inserted into a pair of the narrower grooves 13, the upper pins 10b are gripped tightly by the side walls of said grooves and the lever 10 is then immovably blocked in vertical position within the socket. On the other hand, when the follow-up arm or lever 10 has been inserted in similar fashion into the pair of wider grooves 14 of the socket, it is capable of a certain amount of angular rocking movement about the lower pins 10b which are blocked in the narrowed end depressions 18 of the groove, while the upper pins 10d are positioned in the wider upper part of the grooves.

Reference is made to FIGURES 3a and 3b, which illustrate a movable contact assembly within a socket 8 of the slider 2, as assembled for the provision of a "rest contact," or normally-closed contact assembly. It will be seen that the paired pins 10b and 10d of the follow-up arm have been engaged into the pair of broad grooves 14 of the socket, so that as just explained above the follow-up arm 10 is rockable about the lower pins 10b between the two positions shown in FIGURES 3a and 3b. FIGURE 3a is the position assumed when the slider 2 has been displaced upwards (according to FIGURE 1) or leftwards (according to FIGURES 3a and 3b) to its actuated position by the power means, such as the electromagnet EM, so that the contact assembly is in its open condition, wherein the movable contact element carried by arm 9a is spaced from the fixed contact element 4. FIGURE 3b is the normal or rest position assumed under the force of the return spring S which force is indicated as the arrow $F_1$ in FIGURE 3. In the rest position of FIGURE 3b, the movable contact element is engaging the fixed element 4. It will be seen that in the actuated or work position of FIGURE 3a, where the slider member 2 including socket 8 and the movable contact assembly supported therein has been displaced to its leftward end position relative to the stationary frame member 1 including the partitions 6, the movable contact arm 9 has its flat central body portion 9d applied flat against an end surface of socket 8, and is thereby abutted in a fixed position with respect to the slider 2. The spring 11 is urging the lever 10 away from the contact arm 9 and into engagement with the nose 16 of the partition 6 remote from fixed contacts 4, said spring being thereby placed in a relatively compressed state. When the electromagnet or other actuating force is removed, so that the return spring urges the slider 2 rightward relative to the stationary partitions 16 to the rest position of FIGURE 3b, the follow-up arm 10 is first rocked counterclockwise about its pivots 10b in the slider by the action of spring 11 which keeps the left side of arm 10 in engagement with stop or nose 16. As the movable contact at 9a engages the fixed contact 4 during the continued rightward displacement of the slider, the contact arm 9 in turn is rocked counterclockwise about the pivots 10b, so that its flat body portion 9b is moved away from the adjacent wall of socket 8. Owing to the rocking or "follow-up" movement of lever 10, it will be noted that in the final contact-making position of FIGURE 3b the compression of spring 11 is only slightly greater than in the contact-breaking position of FIGURE 3a. This is due to the fact that during part of the displacement from the contact-breaking to the contact-making position, movable contact arm 9 and its backing lever 10 are displaced in a common direction, with the result that the total variation in the degree of compression of the spring 11 between the two positions of member 2, is considerably smaller than it would be in the absence of displacement of the follow-up arm or lever 10. The pressure between the movable and fixed contacts during the contact-closing movement can thus be maintained more nearly constant than would otherwise be possible, and reducing the force of spring S and hence the power required to move the member 2 in the direction reverse from arrow $F_1$.

Another advantage is that the end point of the slider 2 displacement in the rest position need not be determined with great accuracy but can be varied over quite a wide range without resulting in a corresponding variation in the contact pressure. It should be observed that while the invention makes it possible to provide a contact pressure as high as may be desired without any corresponding increase in the actuating power required, as earlier explained, it will often be found satisfactory to make said pressure quite low while still providing good electrical contact; this is because, owing to the vertically displaced position of the pivot axis 10b from the plane of the movable contact, a material degree of relative slippage occurs between the surfaces of the fixed and movable contact elements during the contact-engaging movement, thereby producing a self-cleaning action which ensures satisfactory electrical contact.

The arrangement described for the movable contact assembly including the interpivoted arms 9 and 10 has the further advantage that it allows of a substantial amount of lateral compensatory displacement as a consequence of which a degree of transverse misalignment as between the two fixed contacts 4 of a pair with respect to the longitudinal center plane of the assembly can be tolerated while still maintaining substantial equality between the contact pressures at the two contacts of the pair. That is, the spring 11 acting substantially along the midplane of the movable bridge contact 9a, allows the contact arm 9 to rock somewhat about its axis normal to the direction of movable bridge contact 9a (a vertical axis according to FIGURE 3), during which movement one of the hooks 9c may be displaced a material distance away from the related pivot pin 10b without any risk of disengagement between the parts of the interpivoted assembly, and thereby preserving the desired balance between the contact pressures at the two sides of the movable contact element 9a, as well as between the individual contact assemblies of the device.

As will become apparent from a later embodiment, the advantages of the invention as described above could also be achieved by having the arm 9 and lever 10 pivoted on separate transverse axes in the slider 2. Thus, the parallel pivotal axes of arms 9 and 10 may be spaced along the slider 2 so as to define one side of a deformable parallelogram the opposite side of which is defined by the line AB (FIGURE 3b) joining the tip of nose 16 (fulcrum point of arm 10) to the center of contact 4 (fulcrum point of arm 9).

In accordance with another modification of the invention, the spring 11 can be arranged so that its direction of action is other than parallel to the direction of said line AB (as it is in the embodiment described). Thus, if desired matters may be so arranged that the compression of the spring 11 will actually decrease during displacement towards the contact-making position, by causing the spring 11 to exert its action on a direction such as CD (FIGURE 3b) at an angle to the said line AB. Since the length of the line CD increases with increasing counterclockwise rocking movement of the arms 9 and 10, it is clear that the spring so arranged would actually relax with rightward displacement of the slider 2.

When the movable contact assembly is to be mounted as a normally-open or work contact assembly rather than a normally-closed contact assembly as described with reference to FIGURES 3a and 3b, the inverted arrangement shown in FIGURES 5a and 5b is used. As earlier indicated, screws 5 are withdrawn, the fixed contact strips 3–4 are interchanged so that the fixed contacts are located at the top of the compartment 6 (with reference to FIGURE 1) rather than at the bottom thereof, i.e., in the position shown in the lowermost compartment of FIGURE 1. Moreover, the movable contact assemby is also inverted and the paired pins 10b and 10d of lever 10 are inserted into the narrow groove 13 instead of the groove 14 as in FIGURE 3. This reversal of the movable contact assembly can very easily be effected while the fixed contact strips 3–4 are removed, by grasping the outer end 10e, suitably conformed, of lever 10 and pulling it out to extract the interpivoted assembly including said lever, arm 9 pivoted to it and interposed spring 11, as a unit out of the socket 8, finger pressure being applied to press the arm against the lever against the force of spring 11 in order to prevent separation between the elements. The unit is then inverted in position and reinserted into the socket with the pairs of pins 10b and 10d now being introduced into grooves 13 instead of grooves 14. As earlier described, in this position the lever 10 is firmly blocked in the upstanding position shown in FIGURES 5a and 5b and is unable now to rock about the lower pivots 10b since the upper pins 10d are tightly engaged by the sides of the narrow grooves 13.

In the idle or normal position shown in FIGURE 5b, the arm 9 has its body portion 9a applied flat against the adjacent wall of socket 8, and the movable contact is spaced from the fixed contact 4. Arm 9 is upstanding parallel to the blocked lever 10 and spring 11 is moderately compressed. When slider 2 is displaced leftward e.g. under electromagnetic force as indicated by arrow $F_2$, engagement of the movable contact with fixed contact 4 rocks the arm 9 clockwise about the pivots 10b with respect to the slider and lever 10 as shown in FIGURE 5a. In this case of course the degree of compression of spring 11 is substantially proportional to the displacement of the slider 2, as in conventional contact systems of this general type. This will usually be desirable in the case of the work (normally-open) contacts, in the usual cases where the actuation is caused by an electromagnet, since the electromagnetic attraction force itself increases as the displacement proceeds owing to the gradual decrease in distance between the magnetic poles and the armature.

However, the invention contemplates the modified embodiment, not shown, wherein the type of operation described above, including the follow-up rocking movement of lever 10 during the contact-making displacement, is present not only in connection with the normally closed or rest contacts but likewise with the normally open or work contacts. This may be especially useful in cases where the displacement of slider 2 in both directions is produced by a positive force of limited strength. To accomplish this result, the only modifications required in the construction of the parts shown, would be. e.g., to provide the grooves 13 with the same width as that provided herein for the grooves 14 (or combine both pairs of grooves into one pair), and furthermore to provide a lever-actuating fulcrum or nose 16 on each of the opposite sides of the partitions 6.

FIGURE 8 illustrates an extension attachment adapted to be fitted to the four-contact device generally shown in FIGURES 1 and 2 and described above, for extending its contact-making capacity. The extension assembly of FIGURE 8 comprises two contact assemblies instead of four, but otherwise is entirely similar in internal construction and operation to the apparatus of FIGURES 1 and 2, and similar parts have been given similar reference numerals. The extension device comprises a stationary frame member 21 corresponding to the frame member 1 with its partitions 6, herein defining two compartments. The frame member 21 is connectable to one end of the frame member 1 by way of a pair of downwardly projecting lugs 23 on one end face of frame 21 engageable with complementary straps 24 (see FIGURE 1) on an end face of frame member 1, thereby to provide a unitary stationary frame structure therewith. Slidable longitudinally of frame member 21 is a slider member 22 which similarly is adapted to be unitarily connected end to end with the slider 2 of the main assembly, by means of a dovetail projection 25 engageable with a pair of complementary lugs 26 provided on the appropriate end of the main slider 2. The extension slider 21, in this case, of course includes two sockets 8 each containing a movable contact assembly similar to what was described with reference to FIGURES 3–7. By the use of one or more extension units of the kind shown in FIGURE 8, it is possible to increase the capacity of an initially installed contactor, device, including say four contact assemblies, without having to exchange or alter it and while using the same actuating electromagnet, should such extension be desired due, say, to the installation of additional equipment to be actuated. It should be noted that the feasibility of thus increasing the number of contacts to be actuated without having to increase correspondingly the power of the electromagnetic or other actuating means used, is a direct result of the improved movable contact structure of the invention, as earlier described, with its substantially reduced power requirements as compared to conventional movable contact devices.

Figure 9:
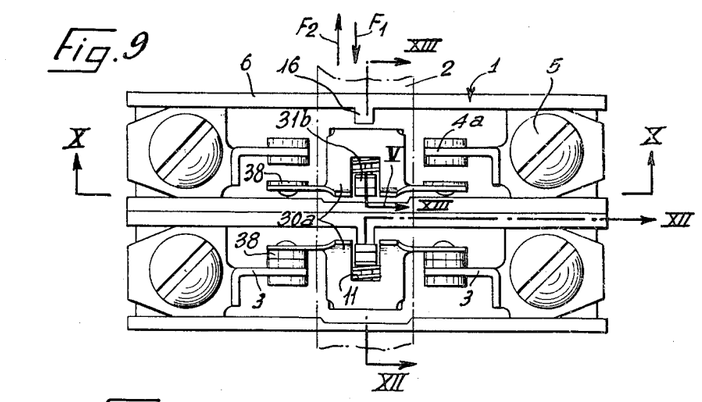
FIGURE 9 is a partial front view of a second embodiment of a multiple contactor device according to the invention.
Figure 10:
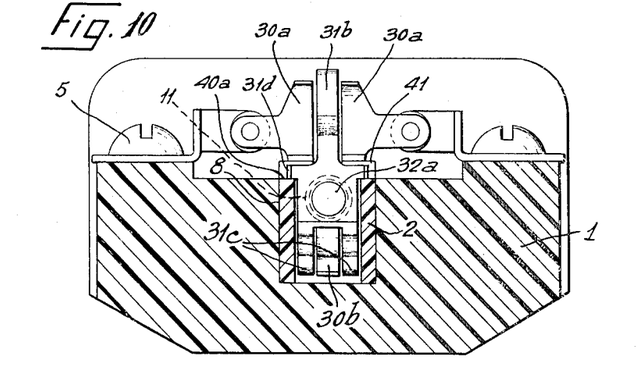
FIGURE 10 is a section on line X—X of FIGURE 9.
Figure 11:
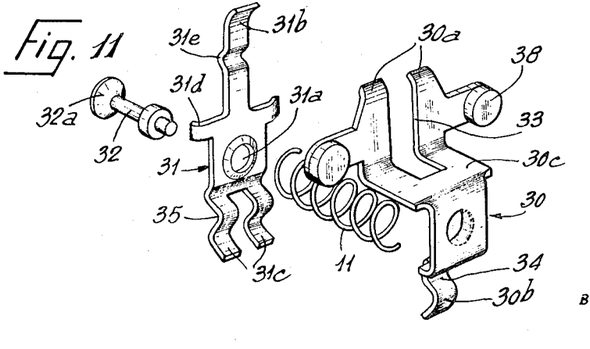
FIGURE 11 is an exploded perspective view showing a movable contact assembly according to the second embodiment.

With reference to FIGURES 9–13, there will now be described another embodiment of the invention in which a manner of operation essentially similar in principle to that described with reference to FIGURES 1–7 is obtained with a different construction of the component parts. Referring first to FIGURES 9 and 10, the two-contact device shown is in its main aspects similar to the device shown in FIGURES 1 and 2 and those parts of it corresponding in function to the parts of said device have been designated by the same numerals and will not be described in detail. As in the first embodiment the slider 2 is shiftable relative to the fixed frame 1 in the upward direction, $F_2$, by the force of power means and in the downward direction, $F_1$, by the force of a restoring spring or the like. In each of the compartments defined by consecutive fixed partitions 6, there is provided a symmetrical pair of fixed contacts including the strips 3 secured by screws 5. However the fixed contact strips 3 are in this case provided with contact elements 4a on each of their opposite sides, and are positioned substantially on the midplane of the compartment, i.e., with the faces of contacts 4a equidistant from the respective partitions 6. Each of the two sockets 8 of the slider 2 cooperating with a fixed-contact compartment contains a movable contact assembly which as shown in FIGURE 11 includes a movable contact arm 30, a follow-up arm or lever 31, an interposed spring 11 and a connecting rod 32. This assembly can be mounted in its compartment 8 in either of two inverted positions to function either as a normally-open or work contacts (as is shown to be the case for the upper compartment in FIGURE 9), or as a normally-closed or rest contacts (as in the lower compartment of FIGURE 9).

In this embodiment both the arms 30 and 31 are stamped and shaped from metal strip. The midportion of follow-up arm 31 is punched with a central hole 31a having a tapered entrance surface, and the central part of contact arm 30 is punched with a registering hole defining an inwardly projecting flange. The connecting rod 32 has a conical head adapted to seat in the entrance of hole 31a, and has a flange near its free end adapted to seat over the end surface of the flange in arm 30, after which the projecting end of the rod 32 is riveted as will be apparent, e.g., from FIGURE 12. The spring 11 is threaded around the intervening part of rod 32 and has its ends seated around the centering bosses defined by the punched holes in arm 30 and arm 31 respectively. Thus it will be apparent that the resulting movable contact assembly can be withdrawn from its socket in slider 2 without any danger of its separating into its component parts.

In this embodiment the follow-up arm or lever 31 is provided with an upstanding leg 31b having an impressed indentation 31e for a reason later given, and which leg is received with slight clearance within a slot 33 defined between two symmetrical upstanding legs 30a of contact arm 30 which are provided with lateral extensions carrying the movable bridging contacts 38 on one of their sides. the legs 30a of contact arm 30 connect with its flat perforated midportion by way of a portion 30c bent at right angles thereto, substantially corresponding in length to that of the connecting rod 32, and with the slot 33 extending over part of said angular portion 30c. Below the flat body part of arm 30 there is an S-shaped projection which first forms a bend 34 the concavity of which is directed away from arm 31 followed by a bend 30b with its concavity towards arm 31. Correspondingly the lower part of arm 31 has a pair of parallel S-shaped legs adapted to straddle the said S-shaped projection of the arm 30, and each defining a first bend 35 concave away from arm 30 followed by a second bend 31 concave towards arm 30, with the lowermost tips of the arms 30 and 31 converging towards each other at 30b and 31b. Finally the follow-up arm 31 is provided with a pair of laterally projecting stabilizing lugs 31d at the top of its perforated central portion.

The opposite end walls of each socket 8 in the slider 2 (see FIGURES 12 and 13) are formed at a level near the bottom plane of the socket with rounded protuberances 36, 37 projecting towards each other, and adapted respectively to be received in the concavities of bends 34 and 35 of the arms 30 and 31 for pivoting said arms in the socket.

When it is desired to mount the movable contact assembly as a rest or a work contact assembly in one of the sockets 8 of slider 2, the upper extremities of the parts 30a and 31b of the arms are gripped as between thumb and forefinger and pressed towards each other compressing spring 11, whereupon the movable contact assembly can be inserted into the socket, with the lower end portions 30b and 31b snapping resiliently into place beyond the protuberances 36 and 37 and the concave bends 34 and 35 fitting over said protuberances to provide the desired pivotal mounting. In this position of the parts, the movable bridging contacts 38 are located opposite one of the faces of the respective fixed contacts 4a. Moreover, the lateral lugs 31d of the follow-up arm are supported on flat shelf surfaces 40a that are formed in the side walls 40 of the socket 8, as seen in FIGURE 10.

One side of each of the fixed partitions 6 is formed with a projecting nose 16. Moreover, each of the shelves 40a in the socket 8 is bounded, substantially intermediate the longitudinal extent of the socket and towards that end thereof directed away from the nose 16, by a rising wall or shoulder surface 41. When it is desired to provide a rest contact assembly, then the movable contact assembly is inserted into the socket 8 in the inverted condition shown in FIGURES 12a and 12b, wherein the projection 31e of the upstanding leg of the follow-up arm 31 is directed towards the nose 16, while the lugs 31d of arm 31 then lie substantially midway of the flat shelf surfaces 40a, clear of the rising shoulders 41 bounding the one ends thereof. In this condition therefore, it will be seen that the follow-up arm 31 is capable of rocking about the protuberance 37 between the two positions shown in FIGURES 12a and 12b, to provide a follow-up action similar to that described in the first embodiment. The projection 31b on the side of the arm 31 is constantly applied against the nose 16. In the actuated (contact-breaking) position shown in FIGURE 12a, the arm 30 has its central body portion seated against the right-hand end wall of socket 8, where the movable bridging contacts 33 carried by the arm are spaced from the related fixed contacts 4a. When the force of the restoring spring (not shown) urges the slider to the right as shown by arrow $F_1$, arm 31 rocks counterclockwise under the action of spring 11 about the pivot formed by protuberance 37, its projection 31e maintaining contact with nose 38; as the movable contacts 38 engage the related fixed contacts 4a, arm 30 in turn is rocked counterclockwise to assume the final contact-making position shown in FIGURE 12b. The total change in compression of the spring 11 between the two positions can be made as small as desired, as in the first embodiment, and can in fact be made negative if so desired by a suitable arrangement of the spring 11 as earlier indicated.

Figure 13A:
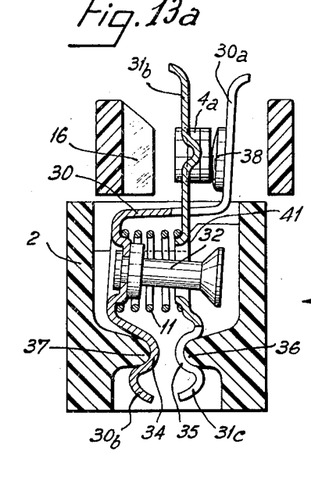
FIGURES 13a and 13b are similar sections, showing the same movable contact assembly mounted for operation as work contacts, respectively in the contact-making actuated position and the contact-breaking normal position of the movable member.
Figure 13B:
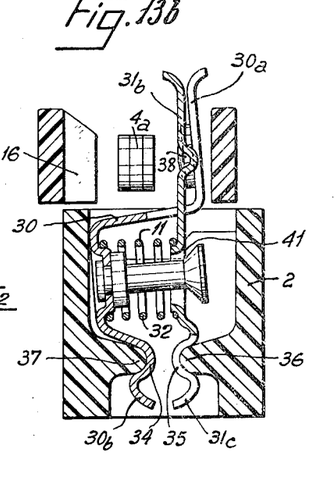

If it is desired on the other hand to mount the movable contact assembly as a work contact assembly, then it is inserted into the socket in the inverted condition shown in FIGURES 13a and 13b. In this condition the arm projection 31e is directed away from the nose 16. The lugs 31d of the arm 31 are engaging the shoulders or ramps 41, and the spring 11 resiliently blocks the arm 31 in the vertical position shown, in abutting engagement with said ramps. The arm 31 is now immovable, and when the slider 2 is shifted leftward by electromagnetic attraction or other means as indicated by arrow $F_2$ from the contact-breaking position of FIGURE 13b to the contact-making position of FIGURE 13a, the arm 30 is rocked clockwise about the pivot formed by protuberance 37 and the compression of spring 11 increases in proportion to the displacement of the slider.

It will be understood that as described for the first embodiment, the structure shown in FIGURES 9–13 can easily be modified to provide for the follow-up movement of arm 31 in the work-contact condition of FIGURES 13a and 13b as well as in the rest-contact condition of FIGURE 12. All that would be necessary would be to omit the abutment shoulders 41 at the one ends of shelves 40a, and to provide additional noses such as 16 on the opposite sides of the partition 6, cooperating with suitable formations on the arm 31.

Figure 12A:
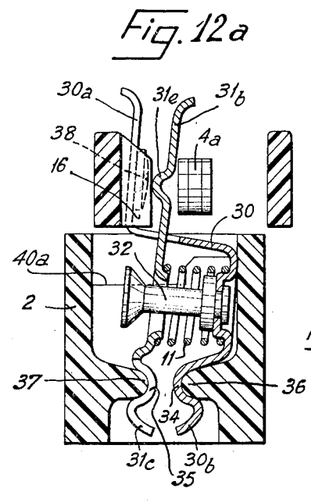
FIGURES 12a and 12b are sectional views, on line XII—XII of FIGURE 9, showing the movable contact assembly of FIGURE 11 mounted for operation as a rest contact assembly, respectively in the contact-breaking actuated position and the contact-making normal positions of the movable member.
Figure 12B:
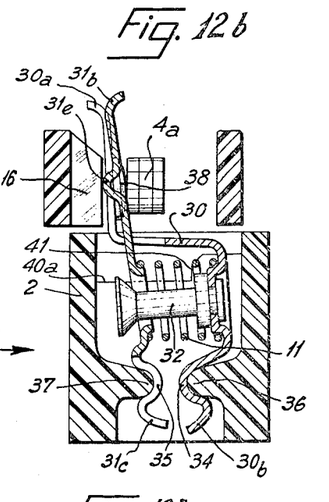

It should be noted that in the embodiment of FIGURES 9–13, the follow-up arm 31, owing to its lateral lugs 31d and fork-shaped end 31c, is at all times blocked against lateral movement in the socket 8, both when it is completely blocked as in FIGURES 13a and 13b, and when it is longitudinally rockable as in FIGURES 12a and 12b. On the other hand, the contact arm 30, owing to the narrow width of its portion 34 seated on the protuberance 36, as well as to the relatively loose fit of connecting rod 32 in the hole 31a, is able to assume some lateral angling about its pivot 36 or 37 in the socket, to take up any misalignment present between the fixed contacts 4a.

Figure 14:
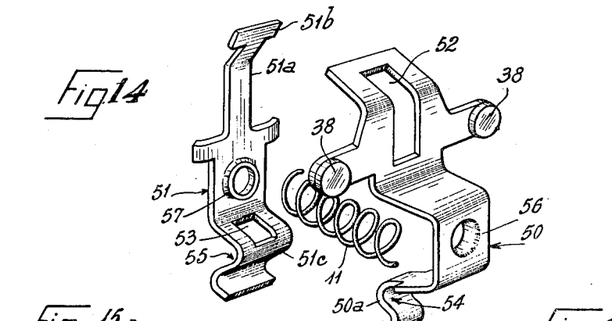
FIGURE 14 is an exploded perspective view of a third embodiment of a movable contact assembly according to the invention.
Figure 15A:
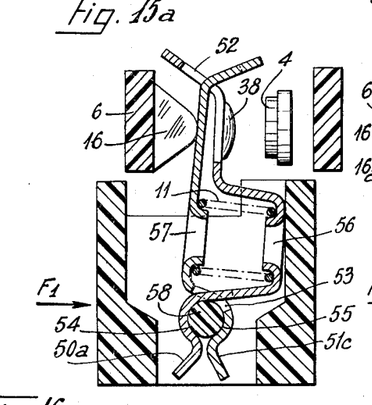
FIGURES 15a and 15b are views corresponding generally to FIGURES 12a and 12b but relating to the form of assembly shown in FIGURE 14, and FIGURES 16a and 16b are views corresponding to FIGURES 13a and 13b relating to the form of assembly shown in FIGURE 14.
Figure 15B:
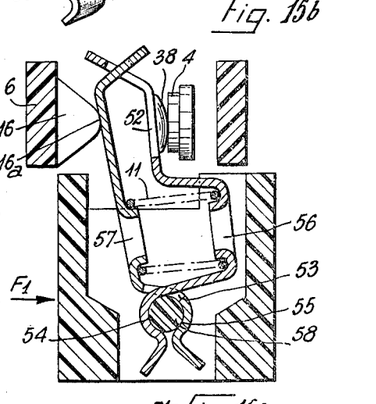

FIGURES 14–16 illustrate yet another embodiment of the movable contact assembly of the invention. This is sufficiently similar in essence to the previously described forms so that only a brief description will suffice. The movable contact arm 50 and follow-up arm or lever 51 are arranged for mutual interpenetration at both ends. That is, the upper part of arm 50 is formed with a slot 52 into which the upper end 51a of arm 51 with an endmost T-portion 51b can project. The lower part of arm 51 has a slot 53 into which the lower part 50a of arm 50 can project. Said lower end part 50a of the contact arm, and also the lower end part 55 of the follow-up arm, are S-shaped so that when interengaged (see FIGURES 15 and 16) their opposed concavities 54 and 55 define a cylindrical seat surrounding a common pivot pin 58 provided across the socket of slider 2. Below said pin the diverging ends 50a and 51c provide a V-shaped entrance facilitating insertion around said pin. Arm 51 is provided with lateral stabilizer lugs 51d similar in form and function to lugs 31d in the preceding embodiment. The spring 11 is centered and seated at its ends around inwardly directed bosses provided by the punching of the holes 56 and 57. To assemble the parts, the T-shaped end 51b of the arm 51 can be inserted into slot 52 in a suitably rotated position of said arm, then the arm can be rotated back to its proper plane as shown in the drawings and the lower end part 50a of the arm 50 can in turn be inserted into the slot 53, after which the spring 11 is interposed between the two arms and the resulting assembly, suitably compressed between thumb and forefinger, can then be inserted into the prescribed position in socket 8 so that the cylindrical seat defined by the concave parts 54 and 55 encompasses the crosspin 54. The assembly can then be released and the spring 11 will hold it firmly in position.

Figure 16A:
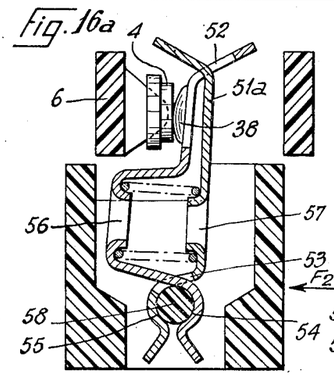
Figure 16B:
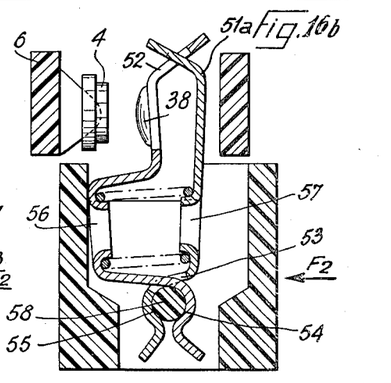

In this embodiment as in the first one described with reference to FIGURES 1–7, the fixed contacts 4 are one-sided, and are reversible so as to face one or the other end of the compartment at a position displaced from the center of the latter, depending on whether the assembly is to function as a rest contact assembly (FIGURES 15a and 15b) or a work contact assembly (FIGURES 16a and 16b). The partitions 6 have noses 16 projecting from their one (or both) sides for engagement with a flat surface of arm 51 in the first case (FIGURES 15a and 15b) but not in the second (FIGURES 16a and 16b). In the work-contact condition, the arm 51 is held in the blocked vertical position through suitable means, not shown, which may be similar to the means provided in the embodiment last described, and cooperating with the lugs 51d. The operation will be readily understood from a consideration of FIGURES 15 and 16 in the light of previous explanations and need not be further discussed, beyond saying that in the rest-contact condition (FIGURE 15) the follow-up arm 51 performs a follow-up movement as a result of which the change in compression of spring 11 between the contact-breaking actuated position (FIGURE 15a) and the contact-making normal position (FIGURE 15b) can be made as small as desired.

Clearly various modifications may be made in the embodiments described in addition to those that have been expressly mentioned. Specific arrangements described with reference to one embodiment may be applicable to general constructions similar to another of the embodiments, so that said arrangements can be combined in various ways. Thus, a connecting rod such as 32 may be used for holding the parts of the movable assembly shown in FIGURE 4 or in FIGURE 14 in more permanently assembled condition. The assembly of FIGURE 4, or that of FIGURE 14, may be modified so that its reversal as between the rest-contact and work-contact conditions will not require simultaneous reversal of the fixed contacts, in a manner similar to the assembly of FIGURE 11; this result requires essentially only a lengthening of the bends providing the central C-shaped portion of the movable contact arm. It may be observed that the embodiments involving a reversal of the fixed contacts simultaneously with the movable contact assembly, as in the first and third embodiments illustrated, are not wholly disadvantageous, in that the reversal requirement constitutes a "fail-safe" feature preventing operation in case of erroneous mounting.

What we claim is:

1. An electric contact device comprising a frame having longitudinal guiding means, fixed contact means carried by said frame on the path determined by said guiding means, a member reciprocable relative to said frame along said path between two positions, a movable contact assembly on said member comprising a contact arm pivotally carried by said member about an axis transverse with respect to said path, movable contact means on said arm engageable with said fixed contact means in a first position of said member, stop means on the member for limiting the the rotation of said contact arm towards said fixed contact means, a spring having one end engaging said contact arm for applying prescribed pressure to said contact means when in engagement, a follow-up arm pivoted to said member about an axis parallel to said transverse axis and engaged by the opposite end of said spring, and stop means on the frame for limiting the rotation of said follow-up arm away from the fixed contact means, whereby movement of the member towards said first position will be accompanied by a follow-up rotation of the follow-up arm away from the fixed contact means to restrict the amount of deformation sustained by the spring between said positions.

2. An electric contact device comprising a frame having longitudinal guiding means, an array of longitudinally spaced fixed contact means carried by said frame on the path determined by said guiding means, a member reciprocable relative to said frame along said path between two positions, an array of movable contact assemblies spaced longitudinally of said member and respectively associated with said fixed contact means, each of said assemblies including a contact arm pivoted to said member about an axis transverse with respect to said path, a movable contact means on said arm engageable with the associated fixed contact means in one or the other of the positions of said member, stop means on the member for limiting the rotation of said contact arm towards the corresponding fixed contact means, and a spring having one end engaging said contact arm for applying prescribed pressure to said contact means when engaged, and at least one of said assemblies further including a follow-up arm pivoted to said member about an axis parallel to said transverse axis and engaged by the opposite end of the spring and stop means on the frame for limiting the rotation of said follow-up arm away from its associated fixed contact means, whereby movement of the member towards that one of its positions in which the contact means associated with said one assembly are engaged will be accompanied by a follow-up rotation of the follow-up arm away from the associated fixed contact means to restrict the amount of deformation sustained by the spring between said positions.

3. A device according to claim 1 wherein said fixed contact means comprises a pair of contacts spaced transversely across the path determined by said guiding means and said movable contact means is arranged to bridge said pair of fixed contacts.

4. An electric contact device comprising a frame having longitudinal guiding means; an array of longitudinally spaced fixed contact means carried by said frame on the path determined by said guiding means; a member reciprocable relative to said frame along said path between two positions; a set of movable contact assemblies each comprising a contact arm having movable contact means thereon, a follow-up arm and a spring having opposite ends engageable with the respective arms; means defining an array of mounting locations spaced longitudinally of said member and each receiving one of said assemblies in either one of two mutually reversely-mounted conditions therein, including means permitting rocking of said contact arm relative to the member about an axis transverse to said path in both said conditions and stop means on the member for limiting the rocking of said contact arm towards the associated fixed contact means in both said conditions, means permitting rocking of the follow-up arm relative to the member about an axis parallel to said transverse axis in a first one of said conditions and stop means on the frame for limiting the rocking of the follow-up arm away from the associated fixed contact means in said first condition; and means for blocking the follow-up arm against rocking relative to the member in a second one of said conditions; whereby movement of the member towards a first one of its positions will cause engagement of the movable contact means of any assemblies mounted in said first condition with the associated fixed contact means, accompanied by a follow-up rocking of the follow-up arms in such assemblies from the associated fixed contact means to restrict the amount of deformation sustained by the springs of any such assemblies between said positions; while movement of the member towards its second position will cause engagement of the movable contact of any assemblies mounted in said second condition with the associated fixed contact means without accompanying rocking of the follow-up arms in such assemblies.

5. A device as claimed in claim 4, including power means for causing movement of the member from its first to its second position and biassing spring means for moving the member from its second to its first position.

6. A device as claimed in claim 4, wherein said contact and follow-up arms of each assembly and the spring therebetween are arranged to be removed from and mounted in a respective location of said member as a unit.

7. A device as claimed in claim 1, wherein said arms are pivoted on a common transverse axis in said member.

8. A device as claimed in claim 7, wherein one of said arms has a pair of aligned laterally projecting pins adapted for pivotal mounting in said member about a transverse axis and the other arm has a pair of hook portions engageable with said pins for independent pivotal mounting about said axis.

9. A device as claimed in claim 7, wherein both arms have hook portions engageable with a common crosspin in said member for independently pivoting both arms about the axis of said crosspin.

10. A device as claimed in claim 1, wherein said arms are pivoted on spaced transverse axes in said member.

11. A device as claimed in claim 10, wherein said arms are formed with opposed indentations pivotally seatable on complementary surfaces formed in said member.

12. A device as claimed in claim 6, wherein said arms in each assembly have freely interfitted end portions and mutually spaced intermediate portions and said spring is a helical compression spring seated between and against said intermediate portions of the respective arms.

13. A device as claimed in claim 6, wherein said arms in each assembly have a connecting rod associated therewith for preventing separation therebetween.

14. A device as claimed in claim 1, wherein said contact arm includes an intermediate body portion for seating on one of its sides said one end of the spring and engageable on its opposite side with said stop means on the member, a portion projecting from one end of said body portion at right angles thereto in the same direction as the spring followed by another portion in a plane generally parallel to said body portion and constituting said movable contact means, and a portion extending from the opposite end of said body portion to that from which said first portion extends and formed to provide means for pivoting the arm to the member.

15. A device as claimed in claim 14, wherein the follow-up arm comprises an intermediate body portion for seating said opposite end of the spring, a portion extending from one end of said intermediate portion in the general plane thereof for engagement with said stop means on the frame, and a further portion extending from the opposite end of said body portion and formed to provide means for pivoting the follow-up arm to the member.

16. A device as claimed in claim 15, wherein the follow-up arm includes a pair of aligned side projections extending to opposite sides therefrom and engageable with opposite side surfaces of said member for stabilizing the follow-up arm therein.

17. A device as claimed in claim 4, wherein the follow-up arm includes a pair of aligned side projections extending to opposite sides therefrom and engageable with opposite side surfaces of said member in said first mounted condition for stabilizing the follow-up arm during rocking thereof, and engageable with abutting means on said side surfaces of the member in said second mounted condition for blocking the follow-up arm against rocking movement.

18. A device as claimed in claim 4, wherein said mounting locations comprises sockets provided in longitudinally aligned relation in said member.

19. A device as claimed in claim 18, wherein said stop means on the member are provided by end walls of said sockets.

20. A device as claimed in claim 4 including engaging means on at least one end of said frame and said member engageable with complementary means provided on the frame and member, respectively, of another similar device to extend the contact-making capacity of said first device.

References Cited by the Examiner
UNITED STATES PATENTS 2,616,998 11/52 Sala ______________ 200—16 X
3,105,128 9/63 Deissler ____________ 200—166 X KATHLEEN H. CLAFFY, *Primary Examiner.*

BERNARD A. GILHEANY, *Examiner.*